US007826937B2

(12) United States Patent
Roux et al.

(10) Patent No.: US 7,826,937 B2
(45) Date of Patent: Nov. 2, 2010

(54) AIRCRAFT EQUIPMENT CONTROL SYSTEM

(75) Inventors: William Roux, Ramonville Saint Agne (FR); Jean Yves Vilain, Pibrac (FR)

(73) Assignee: Airbus France, Toulouse (FR)

( * ) Notice: Subject to any disclaimer, the term of this patent is extended or adjusted under 35 U.S.C. 154(b) by 1814 days.

(21) Appl. No.: 10/915,688

(22) Filed: Aug. 11, 2004

(65) Prior Publication Data
US 2005/0065669 A1    Mar. 24, 2005

(30) Foreign Application Priority Data
Aug. 12, 2003    (FR)    .................................. 03 09862

(51) Int. Cl.
*G01C 23/00*    (2006.01)
(52) U.S. Cl. .............................. 701/3; 701/33; 701/39; 244/75.1; 244/99.2; 244/99.4; 244/99.9; 455/418; 455/419; 700/20; 700/21; 700/22
(58) Field of Classification Search .................... 701/3, 701/33, 39; 244/99.2, 99.4, 99.9, 134 D, 244/75.1; 455/418, 419; 700/20, 21, 22
See application file for complete search history.

(56) References Cited

U.S. PATENT DOCUMENTS

| 5,515,282 | A | * | 5/1996 | Jackson .......................... 701/4 |
| 5,936,318 | A | * | 8/1999 | Weiler et al. .................. 307/66 |
| 6,122,569 | A | * | 9/2000 | Ebert et al. ..................... 701/3 |
| 6,401,014 | B1 | * | 6/2002 | Hill et al. ........................ 701/3 |
| 6,664,656 | B2 | * | 12/2003 | Bernier ....................... 307/9.1 |
| 6,666,400 | B2 | * | 12/2003 | White, III ................... 244/1 R |
| 7,031,810 | B2 | * | 4/2006 | Foch et al. ..................... 701/3 |
| 7,212,890 | B2 | * | 5/2007 | Lafon et al. .................... 701/3 |
| 2002/0109647 | A1 | * | 8/2002 | Crandall et al. .............. 345/2.1 |

(Continued)

FOREIGN PATENT DOCUMENTS

EP    0229559    7/1987

(Continued)

OTHER PUBLICATIONS

McSharry et al. "Triplex Bus-Connected Inter-Unit Selected FCS Configuration," Proceedings of the National Aerospace and Electronics Conference, New York, IEE, vol. 1 conf. 36, pp. 645-651, XP000746254, May 21-25, 1984.*

(Continued)

*Primary Examiner*—Khoi Tran
*Assistant Examiner*—Jorge O Peche
(74) *Attorney, Agent, or Firm*—Dickinson Wright PLLC

(57) ABSTRACT

The control system (1) comprises at least one control panel (P1, Pn) comprising a plurality of operable control means (2) for controllable pieces of equipment (EC1, ECk) of the aircraft, each of which is controlled by first and second computers (3A1, 3Ak, 3B1, 3Bk), and a communication system (4) comprising a first and a second communication channel (5, 6) which are separate from each other and follow different paths (C1, C2), the first communication channel (5) connecting the control means (2) to the first computers (3A1, 3Ak) and the second communication channel (6) connecting the control means (2) to the second computers (3B1, 3Bk), each of said communication channels (5, 6) comprising two different digital communication buses (8, 9; 10, 11).

15 Claims, 4 Drawing Sheets

U.S. PATENT DOCUMENTS

Figure 1:
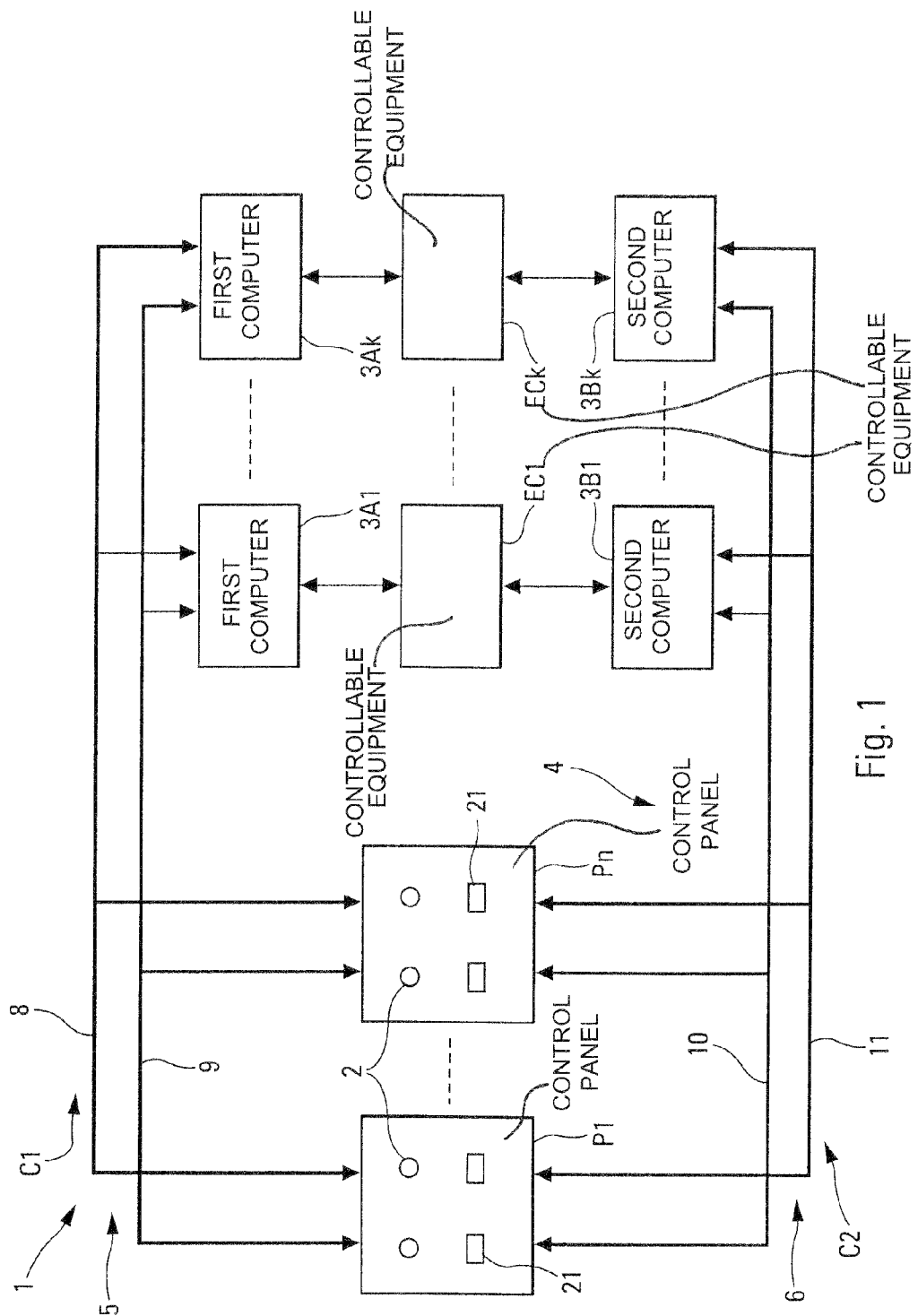

| | | | | |
|---|---|---|---|---|
| 2002/0161488 A1* | 10/2002 | Guillemin et al. | ............... | 701/3 |
| 2002/0181405 A1* | 12/2002 | Ying | ........................... | 370/245 |
| 2003/0195673 A1* | 10/2003 | Foch et al. | ..................... | 701/3 |
| 2004/0158363 A1* | 8/2004 | Lafon et al. | ..................... | 701/3 |
| 2004/0158364 A1* | 8/2004 | Lafon et al. | ..................... | 701/3 |
| 2007/0112480 A1* | 5/2007 | Smith et al. | .................... | 701/10 |
| 2008/0125922 A1* | 5/2008 | Stoner | ........................... | 701/3 |

FOREIGN PATENT DOCUMENTS

| | | |
|---|---|---|
| FR | 2832006 | 5/2003 |
| FR | 2832010 | 5/2003 |
| FR | 2832011 | 5/2003 |

OTHER PUBLICATIONS

Hoyme et al. "ARINC 629 and Safebus: Data Buses for Commercial Aircraft," Scientific Honeyweller, Honeywell's Corporate, Minneapolis, vol. 11, No. 1, XP000289742, pp. 57-70, 1991.*

Hubacek, P, "The Advanced Avionics Standard Communications Bus," Scientific Honeyweller, Minneapolis, Honeywell's Corporate, vol. 11, No. 1, XP000289743, pp. 71-76, 1991.

McSharry, et al., "Triplex Bus-Connected Inter-Unit Selected FCS Configuration," Proceedings of the National Aerospace and Electronics Conference, New York, IEEE, vol. 1 conf. 36, pp. 645-651, XP000746254, May 21-25, 1984.

Hoyme, et al., "Arinc 629 and Safebus: Data Buses for Commercial Aircraft," Scientific Honeyweller, Honeywell's Corporate, Minneapolis, vol. 11, No. 1, XP000289742, pp. 57-70, 1991.

Preliminary Search Report dated Apr. 6, 2004.

* cited by examiner

AIRCRAFT EQUIPMENT CONTROL SYSTEM

The present invention relates to a control system for aircraft equipment, particularly for a transport aircraft.

More precisely, said control system is of the type comprising:
- at least one control panel, located for example in the cockpit of the aircraft and comprising a plurality of control means (push buttons, rotary switches, potentiometers, etc.) which can be operated by an operator, in particular the pilot of the aircraft;
- a plurality of controllable pieces of equipment (air conditioning, de-icing means, etc.) of the aircraft, each of which is controlled by a computer which is associated with it, in accordance with the operation of a control means which is also associated with said control panel; and
- a communication system, for interconnecting the computers and the control means which are associated.

It is known that a civil transport aircraft generally comprises about ten control panels of the aforesaid type, some of which are located on the ceiling of the cockpit.

It is also known that said communication system comprises one or more electrical cables. In fact, each control means of the control panel is connected by an electrical cable directly to the computer of the equipment which it controls.

Owing to the large number of control means on a control panel (more than fifty in some civil transport aircraft), the number of cables connecting said control means to the different controllable pieces of equipment is also high, resulting in overall dimensions and weight which are not insignificant, whereas in general the aim is to reduce the weight of the aircraft and the overall dimensions of its various pieces of equipment as much as possible, in order to maximize the payload.

Moreover, said ordinary control panels do not have means for detecting a failure of said cables between two consecutive maintenance operations on the aircraft.

The present invention relates to a control system for aircraft equipment which enables the aforesaid drawbacks to be overcome.

For this purpose, according to the invention, said control system, of the type comprising:
- at least one control panel comprising a plurality of control means which can be operated by an operator;
- a plurality of controllable pieces of equipment of the aircraft, each of which is controlled by at least a first associated computer, in accordance with at least the operation of a control means which is also associated with said control panel; and
- a communication system, at least for interconnecting the first computers and the control means which are associated, is characterized in that:
- said control system comprises, for at least some of said controllable pieces of equipment, in addition to said first associated computer, in each case a second associated computer which can also control the corresponding controllable equipment in accordance with at least the operation of the associated control means;
- said communication system comprises a first and a second communication channel which are separate from each other, and which follow different paths in the aircraft, the first of these communication channels connecting the control means to said first computers, while the second of these communication channels connects said control means to said second computers; and
- each of said first and second communication channels comprises, at least at the level of said control panel, at least two different digital communication buses.

Thus, the invention provides both segregation and redundancy of the communications designed to control said controllable equipment as a result of the operation of the control means. This is so because:
- the provision of a first and a second computer for each controllable piece of equipment, enabling two separate communication channels to be created, and the use of different paths for these two communication channels, for example on each side of the longitudinal axis of the aircraft, produces said segregation; and
- the duplication of the communication buses in each of said communication channels, at least at the level of the control panel, produces said redundancy.

This communication architecture (segregated and redundant) has a very high level of reliability. It also has the advantage of permitting a significant weight reduction by comparison with an ordinary control panel, because of the reduction of the number of cables due to the use of multiplexed means of communication (digital communication buses).

Additionally, any communication problem in a digital communication bus of the control system according to the invention is clearly detected and signaled to the pilot and/or to a maintenance operator according to its importance, whereas in an ordinary control system of the aforesaid type using electrical cables the detection of the breaking of an electrical cable requires the implementation of supplementary functions in computers, as well as supplementary components.

In a particular embodiment, the control system according to the invention comprises, for at least some of said control means, separate linking means between said control means and each of said digital communication buses. Thus the segregation and redundancy are also achieved within the control panel itself, from a control means to the communication buses. This makes it possible to have four chains for processing the information relating to the state of the control means, these chains being completely independent of each other, and this is advantageous in the case of a failure of a component of one of said information processing chains, since one such failure affects only the corresponding information processing chain and not the other three chains.

In a first embodiment, for at least one of said communication channels, all the digital communication buses are serial links, permitting asynchronous multi-master operation as specified below.

In a second embodiment, for at least one of said communication channels, all the digital communication buses are full duplex switched Ethernet networks. These networks of the AFDX ("Avionics Full Duplex Switched Ethernet") type have enhanced reliability, as specified above.

Additionally, in a preferred embodiment of the invention, at least one of said communication channels comprises:
- two digital communication buses of a first type corresponding to a serial link permitting asynchronous multi-master operation, connected to said control panel;
- a digital communication bus of a second type corresponding to a full duplex switched Ethernet network, which is connected to computers of controllable equipment, these computers being associated with said communication channel; and
- two gateways, connecting said bus of said second type respectively to said buses of said first type.

The latter architecture is advantageous in that it uses a bus of said second type for communication with the computers, providing deterministic transmission times (as specified below), without the risk of wasting the bandwidth of this bus of said second type for communication with the control panels, since these panels are connected to said buses of said first type.

Additionally, in order to increase the reliability of said control system, advantageously:

the latter communication channel also comprises at least one auxiliary digital communication bus of said first type, connecting said control panel to at least one computer of at least one controllable piece of equipment; and/or the latter communication channel also comprises cable links connecting at least some of the control means of the control panel to at least one gateway which is connected to said bus of said second type; and/or at least one of said communication channels of the control system according to the invention also comprises cable links, connecting at least some of the control means of the control panel:

to at least one computer of at least one controllable piece of equipment; and/or directly to at least one controllable piece of equipment.

Furthermore, in a particular embodiment, said control panel also comprises signaling means indicating the state of at least some of said controllable equipment, and said signaling means are connected to said digital communication buses of said communication channels.

Additionally, in a preferred embodiment, the control system according to the invention comprises a plurality of control panels, and each of said control panels is connected to said digital communication buses of said communication channels.

This preferred embodiment makes it possible to reduce the weight and overall dimensions, since the same communication buses are used for a plurality of control panels. It also makes it possible to provide communication between these different control panels.

The figures of the attached drawing will clearly show how the invention can be applied. In these figures, identical references denote similar elements.

FIGS. 1 to 4 are synoptic diagrams of different embodiments of a control system according to the invention.

The control system 1 according to the invention, shown in FIGS. 1 to 4, is mounted on an aircraft which is not shown, particularly a civil transport aircraft, and is designed to control controllable pieces of equipment EC1, . . . , ECk of this aircraft, where k is an integer greater than 1, such as passenger cabin sign lights (for a "no smoking" sign, for example), air conditioning, de-icing means, pumps, valves, etc.

For this purpose, said control system 1 is of the known type, comprising, as shown in FIG. 1, at least one control panel P1, . . . , Pn comprising a plurality of control means 2 (push buttons, rotary switches, potentiometers, etc.) which can be operated by an operator, particularly the pilot of the aircraft;

said plurality of controllable pieces of equipment EC1, . . . , ECk of the aircraft, each of which is controlled by at least a first associated computer 3A1, . . . , 3Ak, in accordance with at least the operation of a control means 2 which is also associated with said control panel P1, . . . , Pn; and a communication system 4, for interconnecting the first computers 3A1, . . . , 3Ak and the control means 2 which are associated.

According to the invention, said control system 1 comprises, for at least some of said controllable pieces of equipment EC1, . . . , ECk, in addition to said first associated computer 3A1, . . . , 3Ak, in each case a second associated computer 3B1, . . . , 3Bk which can also control the corresponding controllable equipment EC1, . . . , ECk, in accordance with at least the operation of the associated control means 2;

said communication system 4 comprises a first and a second communication channel 5, 6 which are separate and follow different paths C1, C2 in the aircraft. The first communication channel 5 connects the control means 2 to said first computers 3A1, . . . , 3Ak, and the second communication channel 6 connects the control means 2 to said second computers 3B1, . . . , 3Bk;

said first communication channel 5 comprises, at least at the level of said control panel P1, . . . , Pn, two different digital communication buses 8, 9; and said second communication channel 6 also comprises, at least at the level of said control panel P1, . . . , Pn, two different digital communication buses 10, 11.

Thus, the invention provides both segregation and redundancy of the communications designed to control said controllable equipment EC1, . . . , ECk as a result of the operation of the control means 2. This is so because:

the presence of two computers (said first and second computers) 3A1, . . . , 3Ak; 3B1, . . . , 3Bk for each controllable piece of equipment EC1, . . . , ECk, enabling the two communication channels 5 and 6 to be created, and the presence of the different paths C1 and C2 of these two communication channels 5 and 6, which are located for example on either side of the longitudinal axis of the aircraft, provides segregation (or separation) of the communications. Thus, even if a problem prevents communication on one side of the aircraft, for example in communication channel 5, the computers 3B1, . . . , 3Bk located on the other side and associated with the communication channel 6 continue to receive instructions and can thus still control the different pieces of equipment EC1, . . . , ECk; and the duplication of the communication buses 8, 9; 10, 11 in each communication channel 5, 6, at least at the level of the control panel P1, . . . , Pn provides redundancy of communications in each of these communication channels 5, 6.

This communication architecture (segregated and redundant) has a very high level of reliability. It also has the advantage of permitting a significant weight reduction by comparison with an ordinary control panel, because of the reduction of the number of cables due to the use of multiplexed means of communication (digital communication buses 8, 9, 10, 11, . . . ).

Additionally, any communication problem in a digital communication bus 8, 9, 10, 11 of the control system 1 according to the invention is clearly detected and signaled to the pilot and/or to a maintenance operator according to its importance, whereas in an ordinary control system of the aforesaid type using electrical cables the detection of the breaking of an electrical cable requires the implementation of supplementary functions in computers, as well as supplementary components.

Clearly, without departure from the scope of the present invention, said control system 1 can comprise only some links which are implemented according to the principle of the invention, described above, while the other links (not shown in FIG. 1) between this control system 1 and the equipment (not shown) of the aircraft are implemented in the ordinary way (by means of non-multiplexed cable links).

The present invention can be applied to a single control panel P1, ..., Pn. However, in a preferred embodiment, the control system 1 comprises simultaneously, as shown in FIGS. 1 to 4, a plurality of control panels P1 to Pn, where n is an integer greater than 1.

In this case, according to the invention, each of said control panels P1 to Pn is connected to the different digital communication buses 8, 9, 10 and 11. This makes it possible to reduce the weight and the overall dimensions, since the same communication buses 8, 9, 10 and 11 are used for a plurality of control panels P1 to Pn.

Furthermore, this preferred embodiment makes it possible to provide communications between the different control panels P1 to Pn. By way of example, without restrictive intent, these communications between control panels P1 to Pn can be used to signal the failure of a control panel or of part of a control panel, and to reallocate control means 2 of another control panel if necessary, to permit the control of controllable equipment EC1, ..., Eck whose control means 2 have broken down.

In a preferred embodiment (not shown), the segregation and redundancy are also provided within each control panel P1, ..., Pn, from a control means 2 up to the digital communication buses 8, 9, 10, 11. For this purpose, use is made of contacts belonging to separate stages of said control means 2, connected to separate processors supplied by separate supply systems for controlling each of the four communication buses 8, 9, 10, 11. This makes it possible to have four chains for processing the information relating to the state of the control means 2, these chains being completely independent of each other, and this is advantageous in the case of a failure of a component of one of said information processing chains, since this failure affects only said information processing chain and not the other three chains.

In the embodiment shown in FIG. 1, the digital communication buses 8 to 11 directly connect the control panels P1 to Pn (more precisely, the control means 2 of these control panels) to the computers 3A1, 3Ak and 3B1, ..., 3Bk which are associated with the controllable equipment EC1, ..., Eck.

In a first variant, said four digital communication buses 8 to 11 are serial links allowing asynchronous multi-master operation, and preferably links specified by the CAN standard (ISO 11898). For reasons of simplicity, therefore, such a link or such a bus will be referred to as a "CAN bus" in the following description.

The CAN bus has high transmission reliability and has time multiplexing of the clock and data, and offers considerable network flexibility because of the principle of information dissemination and CSMA/CA type bus sharing control. It also comprises a set of error detection and signaling mechanisms which provide the bus with a high degree of security.

The principal advantages of a CAN bus are therefore multi-master operation, hierarchical message structuring, flexible configuration, error detecting and signaling, and discrimination between temporary errors and permanent failure errors at the caller level.

In a second variant, said four buses 8 to 11 are full duplex switched Ethernet networks, in other words AFDX ("Avionics Full Duplex Switched Ethernet") networks. For reasons of simplicity, therefore, such a network or such a bus will be referred to as an "AFDX bus" in the following description. It will be noted that, in the context of the present invention:

an "Ethernet network" is a local network protocol which enables a standard rate of 100 megabits per second to be provided. It is specified by the standard IEEE802.3 and enables data to be sent in digital form in packets, a packet being defined as a set of data sent one time only over the network;

the characteristic "full duplex" signifies that the communication line enables data to be routed simultaneously in both directions; and the characteristic "switched" signifies that the packets are switched in the switches to the appropriate outputs.

The AFDX network is a deterministic network. The deterministic property is obtained by the addition of communication services to the Ethernet network. This deterministic property uses the concept of a virtual link, whose bandwidth is guaranteed and segregated from other communications. It should be noted, by way of illustration, that the AFDX bus is the subject of patent application FR-2 832 011. Patent applications FR-2 832 010 and FR-2 832 006 also relate to an AFDX bus of this type.

An AFDX bus offers improved functionality by comparison with a CAN bus, particularly by providing greater reliability of information transmission (because of the deterministic transmission time, the possibility of specifying virtual links between given computers connected to an AFDX network by allocating bandwidth to each virtual link, etc.). The term "deterministic transmission time" signifies that the transmission time can be known in advance. This time is not dependent on the bus load. It is therefore not necessary to evaluate this load in order to determine this transmission time.

In a third variant, the control system 1 according to the invention comprises both CAN buses and AFDX buses. For this purpose, for example, one communication channel can be based on a CAN bus and the other on an AFDX bus.

Figure 2:
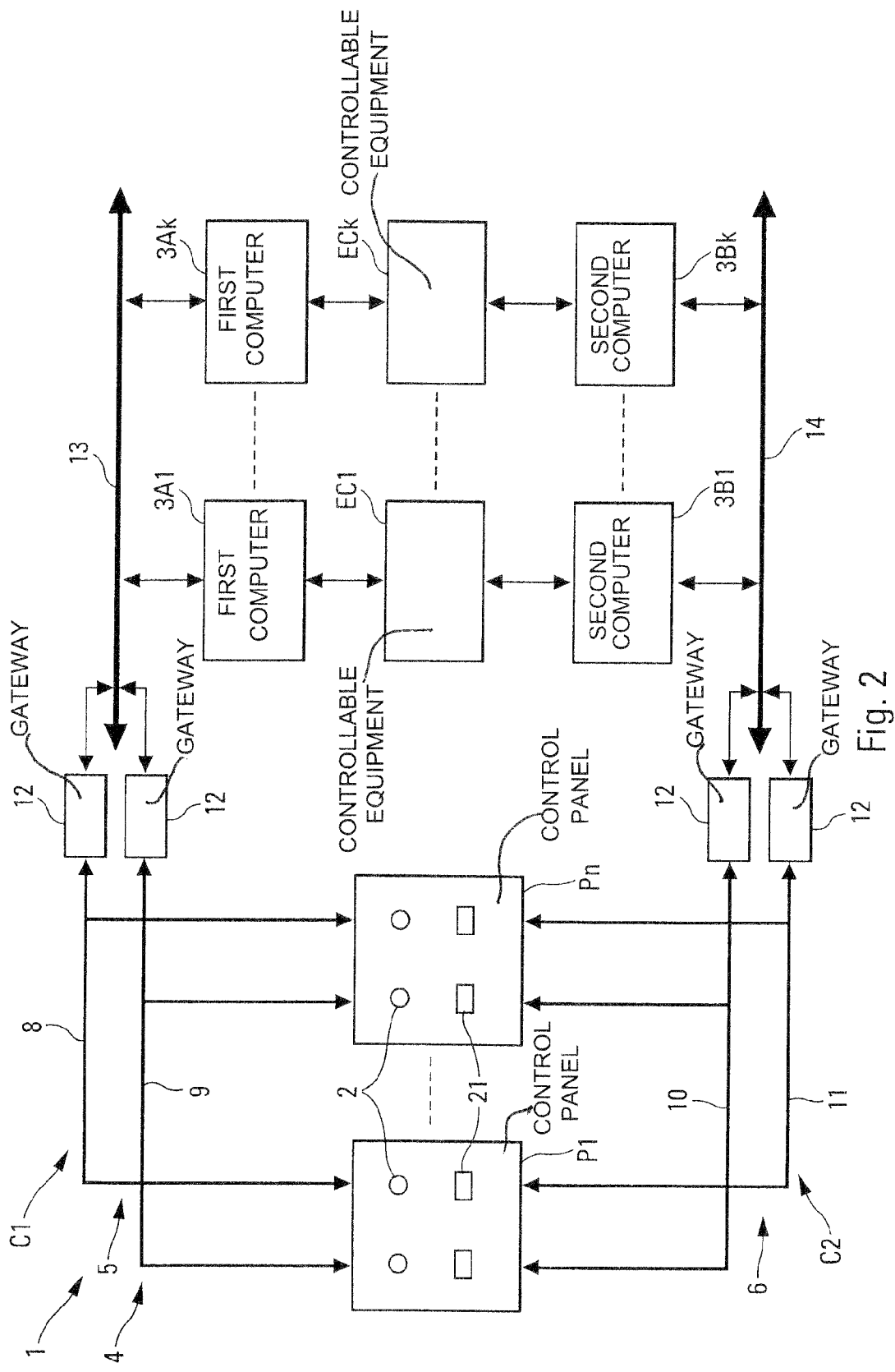

In a preferred embodiment of the invention, shown in FIG. 2, the four buses 8 to 11 connected to the control panels P1 to Pn are CAN buses. Each of these four buses 8 to 11 is also connected to a gateway 12, of the ordinary type, which is also connected to an AFDX bus 13, 14 (bus 13 for communication channel 5 and bus 14 for communication channel 6) providing communication with the computers 3A1 to 3Ak and 3B1 to 3Bk controlling the equipment EC1 to ECk which are controlled by the control means 2 of said control panels P1 to Pn.

This architecture is advantageous in that it uses an AFDX bus 13, 14 for communication with said computers 3A1 to 3Ak and 3B1 to 3Bk, providing deterministic transmission times, without the risk of wasting the bandwidth of this network for communication with the control panels P1 to Pn, since these are connected to the CAN buses 8 to 11. This is because an AFDX bus is a high-speed bus (generally 100 Mbit/s) whose bandwidth is shared between virtual links.

On the other hand, the control panels P1 to Pn do not require such a high communication speed. The advantage of the proposed solution lies in the fact that each CAN bus 8 to 11 enables all the communications from a plurality of control panels P1 to Pn to be centralized in the gateway 12 connected to this CAN bus. The control panels are also connected to the AFDX bus by means of this gateway 12, which requires only a single connection to this AFDX bus, enabling only one part of the bandwidth of the AFDX bus to be allocated for communications relating to the various control panels P1 to Pn. This part of the bandwidth is smaller than the sum of the various parts of this bandwidth which would have to be allocated to each control panel P1 to Pn if it was connected directly to the AFDX bus.

It should be noted that a gateway 12 is an ordinary device which enables communication to be established between equipment communicating according to different protocols, for example between a piece of equipment communicating according to an AFDX protocol and another piece of equipment communicating according to a CAN protocol. A gateway is therefore a translating device which enables one protocol to be converted into another.

Figure 3:
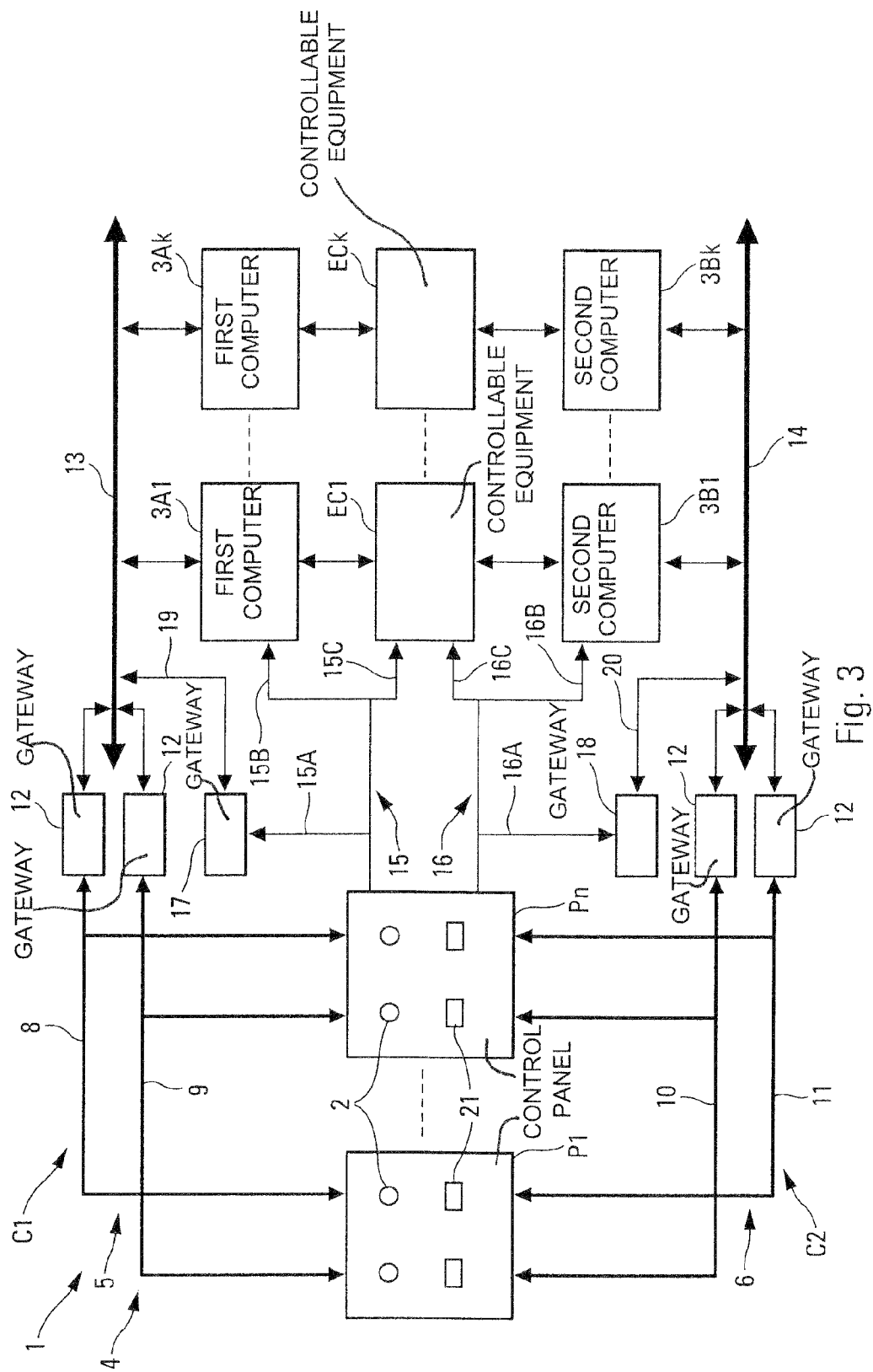

In a variant embodiment of the invention, shown in FIG. 3 and corresponding to the aforesaid preferred embodiment (CAN and AFDX buses coupled by a gateway 12), the communication via bus between a control panel Pn and the computers 3A1, 3B1, corresponding to at least one piece of equipment EC1 which is controlled by this control panel Pn, is duplicated by a direct cable link 15, 16 (without a communication bus), running between the control means 2 used for controlling said equipment EC1 and:

gateways 17, 18 (links 15A and 16A) connected to the same AFDX buses 13 and 14 (links 19 and 20) as the computers 3A1, 3B1 associated with said controlled equipment EC1; and/or said computers 3A1 and 3B1 (links 15B and 16B) associated with said controlled equipment EC1; and/or said controlled equipment EC1 directly (links 15C and 16C).

This variant embodiment enables the reliability to be enhanced.

Figure 4:
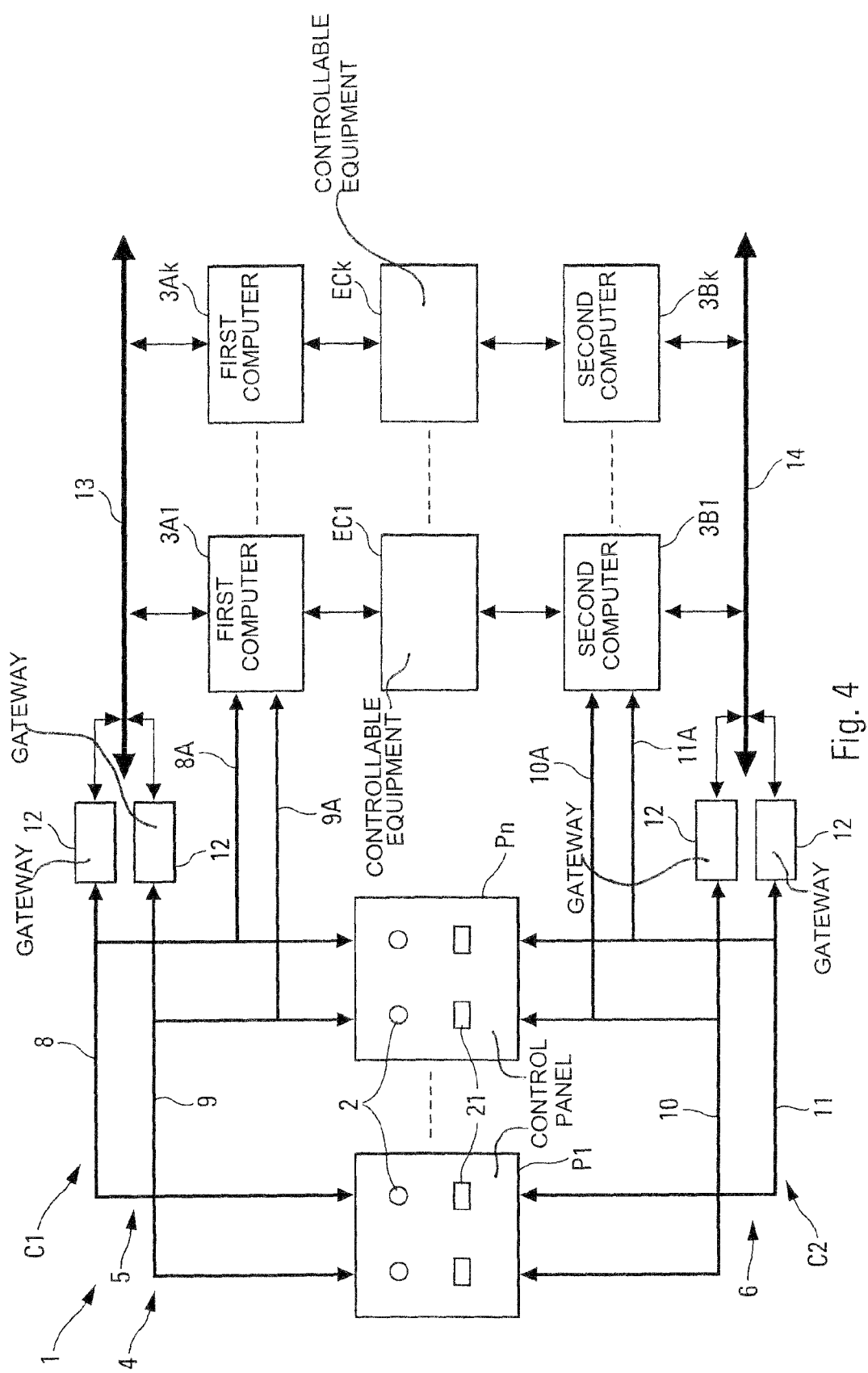

In another variant embodiment of the invention, shown in FIG. 4 and corresponding to the aforesaid preferred embodiment (CAN and AFDX buses coupled by a gateway 12), the communication by means of CAN and AFDX buses between at least one control panel Pn and the computers 3A1 and 3B1 associated with at least one piece of equipment EC1 which is controlled by this control panel Pn is duplicated by links 8A, 9A, 10A, 11A via the CAN bus between the control panel Pn and said computers 3A1 and 3B1. This enables the reliability to be enhanced, since said equipment EC1 can still be controlled by means of the control panel Pn if there is a failure of the AFDX buses 13, 14.

It should also be noted that, when a control panel P1, Pn comprises signaling means 21 designed to signal the state (on, off, out of service, etc.) of the equipment EC1, ..., ECk, the present invention is also applicable to the communication of the state of said equipment EC1, ..., ECk to said signaling means 21. Such an embodiment has the advantage of permitting the use of the same digital communication buses both for controlling said equipment EC1, ..., ECk and for signaling their state, resulting in a reduction of the cabling and consequently a decrease in the weight of the aircraft.

However, this sharing of the means of communication should not be interpreted in a restrictive way, and, without departure from the scope of the invention, it is possible to provide dedicated communication buses for controlling the equipment EC1, ..., ECk (as described above) and other dedicated communication buses, similar to the preceding ones for example, for signaling the state of said equipment EC1, ..., ECk.

The invention claimed is:

1. An aircraft control system, comprising:
a plurality of control panels that each comprise a plurality of control units which are configured to be operated by an operator;
a plurality of controllable pieces of equipment of the aircraft; and
a communication system for interconnecting the controllable equipment and associated control units, said communication system comprising a first and a second communication channel which are separate from each other and follow different paths in the aircraft, each of said first and second communication channels comprising, at least at the level of said control panels, at least two different digital communication buses; and a plurality of first computers and a plurality of second computers, wherein:
each of said controllable pieces of equipment is controlled by at least one of said first computers and at least one of said second computers, in accordance with operation of at least one of said control units which is also associated with said control panels;
said first communication channel connects some of said control units to said first computer;
said second communication channel connects some of said control units to said second computer; and
at least one of said communication channels comprises:
two digital communication buses of a first type corresponding to a serial link permitting asynchronous multi-master operation, linked to said control panels;
a digital communication bus of a second type corresponding to a full duplex switched Ethernet network, which is linked to computers of the controllable pieces of equipment, these computers being associated with a communication channel; and
two gateways, linking said bus of said second type respectively to said buses of said first type, and
each of said control panels is connected to said digital communication buses of said communication channels.

2. The system as claimed in claim 1, wherein the system comprises, for at least some of the control units, separate linking units between said at least some control units and each of said digital communication buses.

3. The system as claimed in claim 1, wherein, for at least one of said first and second communication channels, all the digital communication buses are serial links permitting asynchronous multi-master operation.

4. The system as claimed in claim 1, wherein, for at least one of said first and second communication channels, all the digital communication buses are full duplex switched Ethernet networks.

5. The system as claimed in claim 1, wherein said at least two digital communication buses of at least one of said first and second communication channels comprises:
two digital communication buses of a first type corresponding to a serial link permitting asynchronous multi-master operation, linked to said control panel;
a digital communication bus of a second type corresponding to a full duplex switched Ethernet network, which is linked to at least some of said first and second computers associated with said controllable pieces of equipment, these computers being associated with one of said first and second communication channels; and
two gateways, linking said bus of said second type respectively to said buses of said first type.

6. The system as claimed in claim 5, wherein said at least two digital communication buses of at least one of said first and second communication channels further comprises at least one auxiliary digital communication bus of said first type, connecting said control panel to at least one computer associated with at least one of the controllable pieces of equipment.

7. The system as claimed in claim 5, wherein said at least one of said first and second communication channels further comprises cable links connecting at least some control units of the control panel to at least one gateway which is connected to said bus of said second type.

8. The system as claimed in claim 1, wherein at least one of said first and second communication channels also comprises cable links connecting at least some control units of the control panel to at least one of said first and second computers associated with at least one of the controllable pieces of equipment.

9. The system as claimed in claim 1, wherein at least one of said first and second communication channels also comprises cable links connecting at least some control units of the control panel directly to at least one of the controllable pieces of equipment.

10. The system as claimed in claim 1, wherein said control panel also comprises signaling units indicating the state of at least some of said controllable pieces of equipment, and in that said signaling units are connected to said digital communication buses of said first and second communication channels.

11. The system as claimed in claim 1, wherein said first and second communication channels are positioned respectively on opposite sides of the longitudinal axis of the aircraft.

12. The system as claimed in claim 1, wherein the system comprises a plurality of control panels, and each of said control panels is connected to said digital communication buses of said first and second communication channels.

13. An aircraft, wherein the aircraft comprises the system of claim 1.

14. The system as claimed in claim 1, wherein said at least two digital communication buses of at least one of said first and second communication channels further comprises at least one auxiliary digital communication bus of said first type, connecting said control panel to at least one computer associated with at least one of the controllable pieces of equipment.

15. The system as claimed in claim 1, wherein said at least one of said first and second communication channels further comprises cable links connecting at least some control units of the control panel to at least one gateway which is connected to said bus of said second type.

* * * * *